US012619444B2

(12) United States Patent
Botti Filho et al.

(10) Patent No.: US 12,619,444 B2
(45) Date of Patent: May 5, 2026

(54) ANALYZING AND RECOMMENDING INITIAL WORKLOAD SIZING TO BE RUN ON A CLUSTER

(71) Applicant: INTERNATIONAL BUSINESS MACHINES CORPORATION, Armonk, NY (US)

(72) Inventors: Cesar Lourenco Botti Filho, Raleigh, NC (US); Pablo Roberto Millicay Gonzalez, São Paulo (BR); Diego Brito Veiga, São Paulo (BR); Jorge Damiao Barbosa das Chagas, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 17/538,615

(22) Filed: Nov. 30, 2021

(65) Prior Publication Data

US 2023/0168904 A1 Jun. 1, 2023

(51) Int. Cl.
G06F 9/445 (2018.01)
G06N 20/00 (2019.01)

(52) U.S. Cl.
CPC ......... G06F 9/44505 (2013.01); G06N 20/00 (2019.01)

(58) Field of Classification Search
CPC ......... G06F 9/44505; G06F 2009/4557; G06F 9/45558; G06N 20/00
See application file for complete search history.

(56) References Cited

U.S. PATENT DOCUMENTS

| | | | |
|---|---|---|---|
| 7,668,703 | B1 | 2/2010 | Rolia et al. |
| 8,601,253 | B2 | 12/2013 | Karve et al. |
| 8,856,337 | B2 | 10/2014 | Otani |
| 9,477,530 | B2 | 10/2016 | Nachtrab et al. |
| 10,503,553 | B1 | 12/2019 | Ashok et al. |
| 10,581,964 | B2 | 3/2020 | Einkauf et al. |
| 10,620,930 | B2 | 4/2020 | Borthakur et al. |
| 10,652,308 | B2 | 5/2020 | Kalathur et al. |
| 2014/0075032 | A1 | 3/2014 | Vasudevan et al. |
| 2014/0115592 | A1 | 4/2014 | Frean et al. |

(Continued)

FOREIGN PATENT DOCUMENTS

WO 2018/064946 A1 4/2018

OTHER PUBLICATIONS

Mell et al., "The NIST Definition of Cloud Computing", NIST, Special Publication 800-145, Sep. 2011, 7 pages.

(Continued)

*Primary Examiner* — Kevin L Young
*Assistant Examiner* — Phuong N Hoang
(74) *Attorney, Agent, or Firm* — Seed Intellectual Property Law Group LLP

(57) ABSTRACT

A computer-implemented method is described that provides an initial workload sizing to be run on a cluster. This includes receiving a configuration file defined to create a container using verified cluster limits. The configuration file is verified and sections of interest containing input values to define a family of a container definition are extracted. The verified configuration file is classified as Good, Bad or Neutral by a trained classification model using the input values. The configuration file is tagged with the classification, and Neutral classifications are tagged as Good with a warning. For a Bad classification, a knowledge database is consulted to identify whether family specification limits exist. If the family limits exist, the configuration file is adjusted using a new set of cluster limits associated with the family specification. If the family limits do not exist, the configuration file is adjusted using a new set of aleatory updates.

20 Claims, 10 Drawing Sheets

(56)                    References Cited

U.S. PATENT DOCUMENTS

| | | | | |
|---|---|---|---|---|
| 2014/0130055 | A1 | 5/2014 | Guha | |
| 2016/0328273 | A1 | 11/2016 | Molka et al. | |
| 2018/0027060 | A1* | 1/2018 | Metsch | H04L 41/145 |
| 2018/0027100 | A1* | 1/2018 | Jeuk | H04L 67/02 |
| | | | | 370/469 |
| 2018/0064946 | A1 | 3/2018 | Aghassian | |
| 2018/0287956 | A1 | 10/2018 | Bryc et al. | |
| 2019/0129498 | A1* | 5/2019 | Leung | G06F 1/3287 |
| 2020/0019311 | A1* | 1/2020 | Zolotow | G06F 3/067 |
| 2020/0026560 | A1* | 1/2020 | Singh | G06F 9/5083 |
| 2020/0210708 | A1* | 7/2020 | Jia | G06F 18/214 |
| 2020/0387401 | A1* | 12/2020 | Zhou | G06F 18/24 |
| 2021/0117719 | A1* | 4/2021 | Tiwary | G06N 7/01 |
| 2021/0182169 | A1* | 6/2021 | Mardente | H04L 43/0894 |
| 2021/0382727 | A1* | 12/2021 | Vigil | G06F 9/5022 |
| 2022/0317922 | A1* | 10/2022 | Gokam | G06F 3/061 |
| 2022/0318050 | A1* | 10/2022 | Gokam | G06F 9/4875 |

OTHER PUBLICATIONS

Disclosed Anonymously, "System and Method to efficiently profile the pods in a Kubernetes Cluster", IPCOM000260761D, ip.com, Dec. 19, 2019, 7 pages.

Ahmed, "Kubernetes Resources Requests and Limits 101", https://www.magalix.com/blog/kubernetes-resource-requests-and-limits-101, May 30, 2019, 8 pages.
Anonymous, "Quotas and Limit Ranges", https://docs.openshift.com/enterprise/3.2/dev_guide/compute_resources.html, accessed Nov. 18, 2021, 16 pages.
Anonymous, "Federator.ai", https://docs.datadoghq.com/integrations/federatorai/, accessed Jan. 29, 2021, 11 pages.
Anonymous,"Find an optimal set of nodes for a Kubernetes cluster", blog.kubecost.com/blog/cluster-right-sizing/, Feb. 19, 2020, 4 pages.
Anoymous, "Choose Size and Scope of Google Kubernetes Engine Clusters", https://cloud.google.com/solutions/scope-and-size-kubernetes-engine-clusters, accessed Jan. 29, 2021, 6 pages.
Anoymous, "Application Container Market", https://www.marketsandmarkets.com/Market-Reports/application-container-market-182079587.html, accessed Nov. 18, 2021, 16 pages.
Anoymous, "Configure Default CPU Requests and Limits for a Namespace", https://kubernetes.io/docs/tasks/administer-cluster/manage-resources/cpu-default-namespace/, accessed Nov. 18, 2021, 5 pages.
Advanced Bash-Scripting Guide: Appendix E. Exit Codes With Special Meanings, Aug. 19, 2025, 01 page, https://tldp.org/LDP/abs/html/exitcodes.html.
Martinez Javier "Kubernetes OOM and CPU Throttling", Jan. 25, 2023, 05 pages, https://www.sysdig.com/blog/troubleshoot-kubernetes-oom.

* cited by examiner

ANALYZING AND RECOMMENDING INITIAL WORKLOAD SIZING TO BE RUN ON A CLUSTER

BACKGROUND

Aspects of the present invention relate generally to workloads in a cluster, and more particularly, to improving the use of resources in containers executing on a computing device.

In existing systems there are various ways of isolating processes executing on a machine. Some environments use virtual machines. Other environments use containers. Containers are typically seen as an abstraction in the application layer, whereby code and dependencies are compiled or packaged together. It is often feasible to run multiple containers on one machine. Each container instance shares the operating system (OS) kernel with other containers, with each running as an isolated process. Isolated processes may be preferred in implementations for security or other purposes. A sample application, or a microservice, is packaged into a container image and deployed for use through the container platform. The container platform is basically client-server software facilitating the execution of the container by providing three key operational components:

- A daemon, which is a process that runs in the background. This daemon manages objects like images, containers, and other communication (network), and storage (data volume) objects needed by the microservice encapsulated within the container.
- An application programming interface (API) which allows programs to interact with and direct the daemon process.
- A command line interface (CLI) where a client may issue commands, like "pull" and "run", and is used to access container images from a configured registry. The command line uses the API to control or interact with the daemon through direct commands, or scripts containing commands. The daemon, in turn, delivers the results through the Host OS System for further processing, or as a final output.

SUMMARY

In a first aspect of the invention, there is a computer-implemented process including receiving a configuration file containing input values as a candidate for a workload sizing of a container in a cluster using verified cluster limits; verifying the configuration file of the candidate; extracting sections of interest from the verified configuration file; and classifying the verified configuration file into an output containing a classification of one of Good, Neutral or Bad. In response to an output containing a classification of Good or Neutral, the process indicates that the configuration file is ready to deploy, and provides the configuration file as the workload sizing candidate. In response to the output containing a classification of Bad, the process adjusts the configuration file with a new set of cluster limits as an adjusted configuration file, and classifies the adjusted configuration file into an output containing a classification of one of Good, Neutral or Bad. The adjusting and classifying of the adjusted configuration file are repeated until an output classification of Good or Neutral is identified, and providing the adjusted configuration file having the Good or Neutral output classification as the workload sizing candidate.

In another aspect of the invention, there is a computer program product including one or more computer readable storage media having program instructions collectively stored on the one or more computer readable storage media. The program instructions are executable to: provide an initial workload sizing for a container to be run on a cluster, and wherein the program instruction are executable to: receive a configuration file, defined using a predetermined data serialization language, as a candidate to create a container using verified cluster limits; verify the configuration file of the candidate; extract sections of interest from the verified configuration file, containing input values to define a family of a container definition; classify the verified configuration file into an output containing a classification of one of Good, Neutral or Bad, using a predetermined classification model using the input values; responsive to a Good classification, indicate the configuration file is ready to deploy by tagging the configuration file as Good; and responsive to a Neutral classification, indicate the configuration file is not bad, by tagging the configuration file as Good with a warning. The program instructions are further executable to: responsive to a Bad classification: determine whether family specification limits exist for the workload in one or more knowledge databases including technical specifications; responsive to determining the family specification limits exist, adjust the configuration file using a new set of cluster limits, the new set of cluster limits associated with the family specification; and responsive to determining family specification limits do not exist, adjust the configuration file using a new set of aleatory updates.

In another aspect of the invention, there is system including a processor, a computer readable memory, one or more computer readable storage media, and program instructions collectively stored on the one or more computer readable storage media. The program instructions are executable to provide an initial workload sizing for a container to be run on a cluster, wherein the program instructions include instructions executable to: receive a configuration file, from a user, the configuration file defined using a predetermined data serialization language, as a candidate to create a container using verified cluster limits; verify the configuration file of the candidate; extract sections of interest from the verified configuration file, containing input values to define a family of a container definition; and classify the verified configuration file into an output containing a classification of one of Good, Neutral or Bad, using a predetermined classification model using the input values. The program instructions are further executable to, in response to the output containing classification of Good or Neutral, indicate that the configuration file is ready to deploy, and provide the configuration file to the user. The program instructions are further executable to, in response to the output containing classification of Bad, consult a knowledge database including technical specifications and adjust the configuration file with a new set of cluster limits, and then repeat the classifying.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
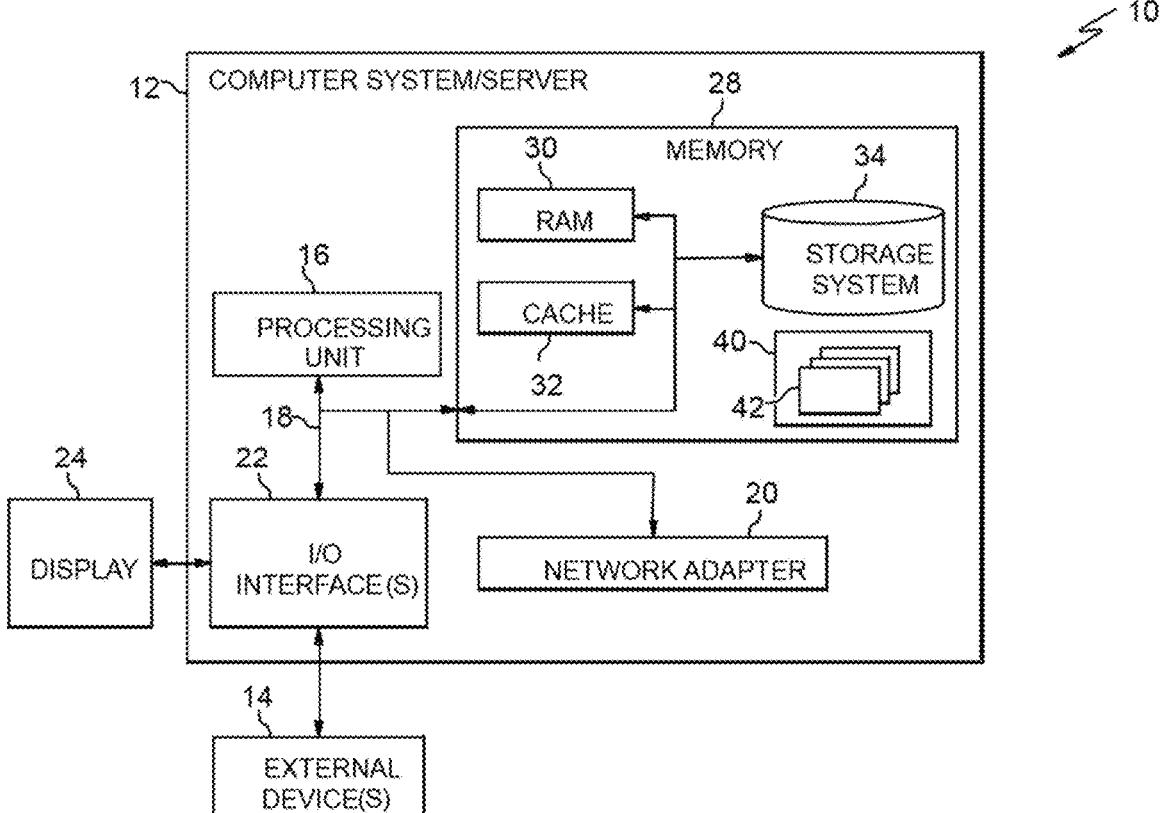
FIG. 1 depicts a cloud computing node according to an embodiment of the present invention.

Aspects of the present invention relate generally to creating and launching more efficient containers and, more particularly, to a system and method to guide developers or workload owners to classify and produce workload definitions that are compatible with the workload expected "work" and cluster. The workload definitions must fit the cluster in which it will run, but also need to have enough minimal resources to avoid failure when it is running. This disclosure describes embodiments to classify the recommended workload definition patterns, reviewing the application specifications based on container limits and requests for an ideal cluster application configuration. Embodiments provide a recommended workload sizing to a cluster administrator, software developer, or workload owner to assist in the creation of container workload definitions, i.e., a container configuration file, to prevent failures during runtime of the cluster and containers. Preventing failures can be extremely important, especially when there are service level agreements (SLAs) requiring uptime performance in the cluster.

A workload definition pattern, as mentioned above, is a set of identifiers, i.e., in Kubernetes, (aka K8s) an open-source system for automating deployment, scaling, and management of containerized applications, the image name and a set of key labels. A "family" of workloads share a similar behavior. For convenience, the term "family" is used herein to represent groups of containers that have similar workload patterns or share similar workload behavior. Over time, the historical patterns may grow due to learning and from scraping sources or observing cluster behavior. As new labels are discovered, more accurate models can be trained using machine learning models. For instance, JVM and the Scala Programming language may be the same pattern (e.g., family), even though they have different images. In an implementation, they may share the same workload behavior, e.g., the same family of patterns.

Containers may generally save costs as compared to using a virtual machine (VM). For instance, when launching applications in a VM, all required resources must be reserved at launch. Thus, if you have a computing device with 8 cores, and have three VMs each requiring three cores to execute, you cannot run all three VMs at the same time, even if they are idle much of the time. In contrast, using containers within clusters can be more efficient. For instance, in the same scenario, if each of three containers require three cores to execute at maximum workload, they may all be launched at the same time on a computing device with only eight cores. Containers can share resources with other containers in a cluster. However, a container configuration specifies maximum and minimum resources required. So, if the same three containers require three cores at a minimum, they might not be able to run simultaneously on the same device. Thus, it is important for developers to accurately predict workload patterns for the containers so that they can be properly launched and balanced among various clusters and computing devices.

According to aspects of the invention, embodiments assist architects, system administrators, operations professionals, and software developers to automate the process regarding admission control of new workloads (decision making of adding a new workload in the cluster). Embodiments may avoid failures and save time and money during the architectural definition decisions. In embodiments, workload definitions pattern validation sizing methods are based on recommended thresholds which suggest the ideal workload sizing to avoid known issues and failures in the cluster application.

In existing systems, a container may be based on similar containers of the same family. A container/cluster program administrator may have to manually develop a configuration file for each new container based on previous containers in the same family or guess as to the resources needed for the container. There may be a high failure rate, e.g., the container crashes or fails to include the appropriate resources, with this manual method. Embodiments disclosed herein help guide developers or workload owners to produce workload definition pattern configurations (container configurations) that are compatible with the workload expected "work" and cluster. The container must fit the cluster in which it will run and needs to have enough minimal resources to avoid failure after running for some time.

To properly define a workload specification, understanding of the underlying tools used (i.e., Java Virtual Machine (JVM), Go programming language, Python interpreter, etc.) to create the workload patterns of resource consumption is important to create proper sizing. Cluster sizing, patterns already deployed, and limits of the cluster resources must be understood, as well. Novice developers may have difficulty "guessing" correctly. To accomplish this using an automated method, embodiments search existing repositories to identify how to create a workload pattern validation to have a "functional" resource specification specific to their cluster, that satisfies its new workload demands.

In an embodiment, workload definition pattern validation is used to build a technical specification database/repository with relevant data based on a snapshot overview of all cluster containers. This snapshot extracts information regarding the lifecycle of the container (i.e., family, limits, requests, classification status), analyzes existing architectural documents (i.e., scraped GitHub files), and extracts known good clusters and containers parameters. To reduce the necessity of data science effort training, embodiments use automated machine learning techniques to produce the most updated model to be used by the classifier tool (the trained model), and create an output generator required by the workload pattern classifier.

In an embodiment of the invention, there is a computer-implemented process including: a module for determining an initial workload sizing to be run on a given cluster, the computer-implemented process comprising: in response to receiving a configuration file, defined using a predetermined data serialization language, as a candidate to create a container using verified cluster limits, verifying the configuration file; extracting sections of interest from the configuration file verified, including limits and requests sections, containing input values to define a family of a container definition; classifying, using a predetermined classification model, the input values of the limits and requests sections into an output containing a classification of one of Good, (all input values of the limits and requests returned are Good), Neutral (not able to determine any input values of the limits and requests as one of Good or Bad) or Bad (at least one of the input values of the limits and requests returned Bad); in response to classifier output of Good, indicating the configuration file is ready to deploy with an associated low chance of failure by tagging the configuration file as good; in response to the classifier output of Neutral indicating the configuration file is not bad, with an associated score not sufficient to be good, by tagging the configuration file as good with a warning; in response to the classifier output of Bad, indicating a high chance of failure, consulting a knowledge database including technical specifications to determine whether family specification limits exist; in response to a determination family specification limits exist, generating a new set of cluster limits; adjusting the configuration file using the new set of cluster limits; reclassifying the configuration file adjusted with the new set of cluster limits; in response to a determination family specification limits do not exist, generating a new set of aleatory updates for the configuration file; adjusting the configuration file using the new set of aleatory updates; and reclassifying the configuration file adjusted with the new set of aleatory updates.

Implementations of various embodiments may provide an improvement in the technical field of container development and launching. In particular, implementations collect or "scrape" information from available repositories to identify existing configuration files within the same family of container, identify cluster limits for the container, and automatically select the current container configuration based on known resource requirements and expected probability of failure/success using the configuration. In embodiments a program module automatically classifies the recommended workload definition patterns, reviews the application specifications and requests for an optimized cluster application configuration to classify the recommended workload definition patterns, reviewing the application specs and requests for an optimized cluster application configuration. Methods as described herein improve the technical field of containers in clusters by launching the container with more optimized limits and resources to reduce runtime failure of the container. Implementations may transform an article to a different state or thing. In particular, implementations may modify the configuration for a container which will launch the container process utilizing different resources, based on the results of scraping the repositories, classifying the container family, and using machine learning to improve the configurations dynamically.

It should be understood that, to the extent implementations of the invention collect, store, or employ personal information provided by, or obtained from, individuals (for example, public or private repositories such as GitHub), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
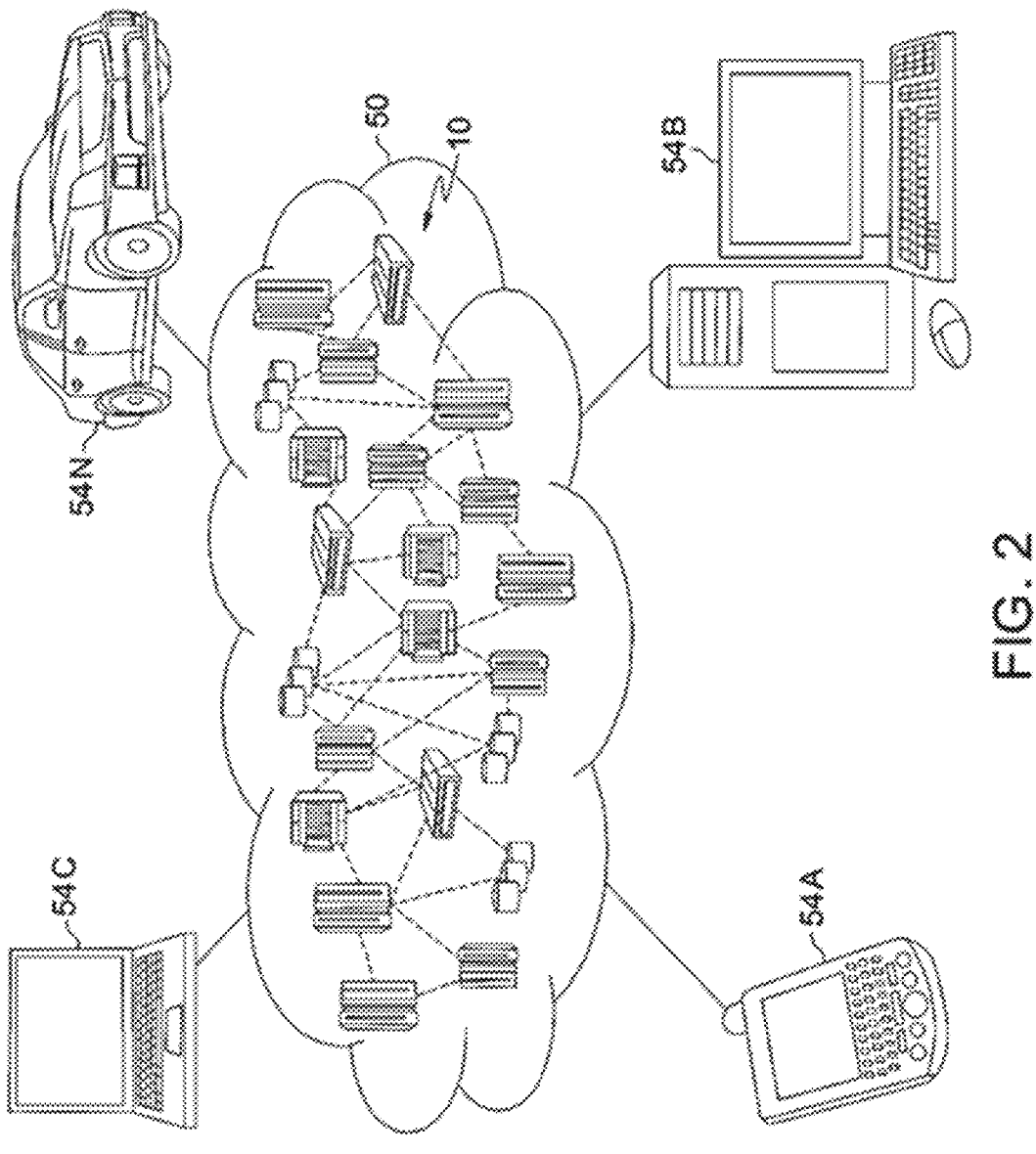
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
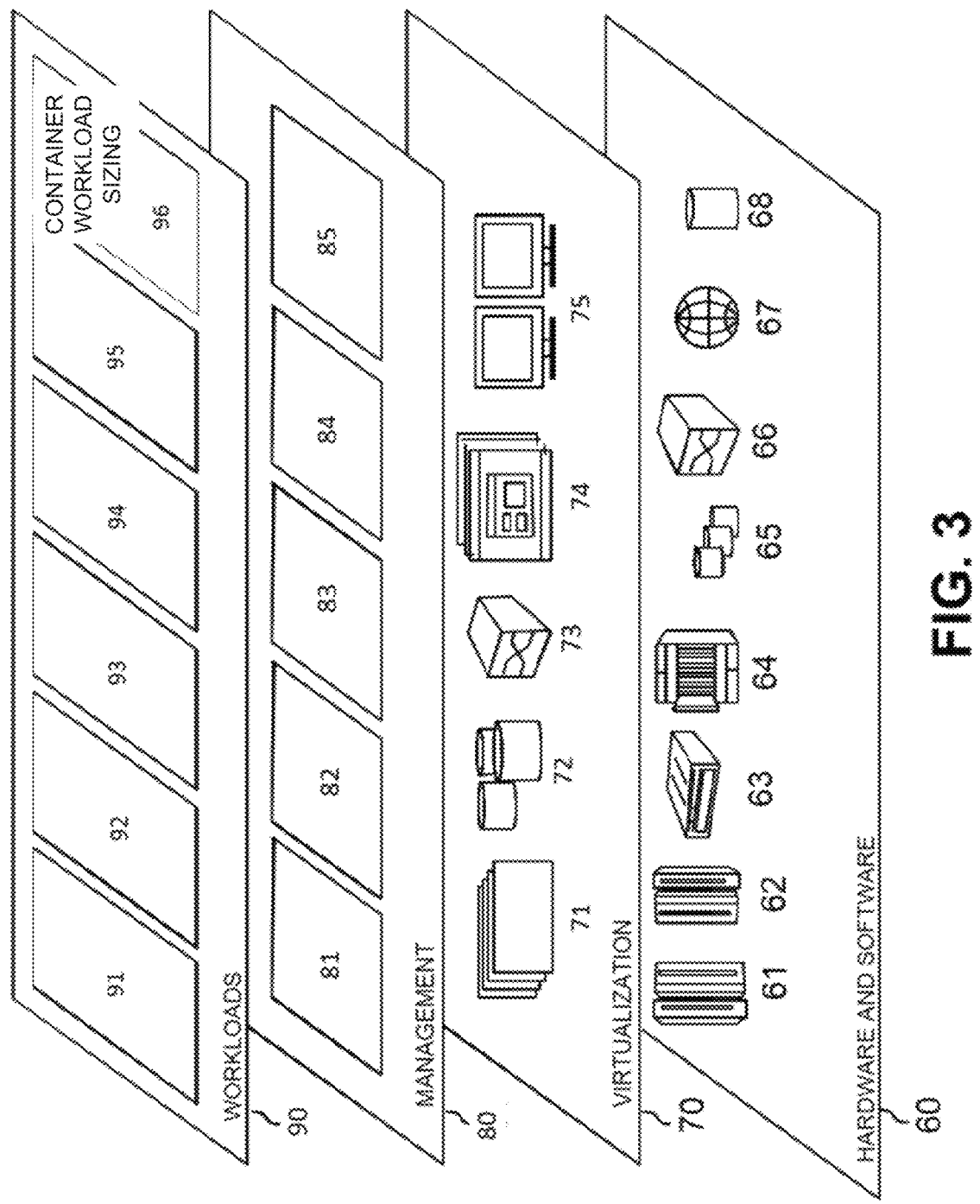
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and container workload sizing 96.

Implementations of the invention may include a computer system/server 12 of FIG. 1 in which one or more of the program modules 42 are configured to perform (or cause the computer system/server 12 to perform) one of more functions of the container workload sizing 96 of FIG. 3. For example, the one or more of the program modules 42 may be configured to: classify a family type for a new container; scrape existing configuration file repositories for the container family type; generate input features; prepare the data; train models based on the family type using machine learning models; determine whether a configurations for the family is one of a Good, Neutral or Bad classification based on likelihood of success while running; generate a configuration file for the container based on at least the classifications for similar configuration files.

Figure 4:
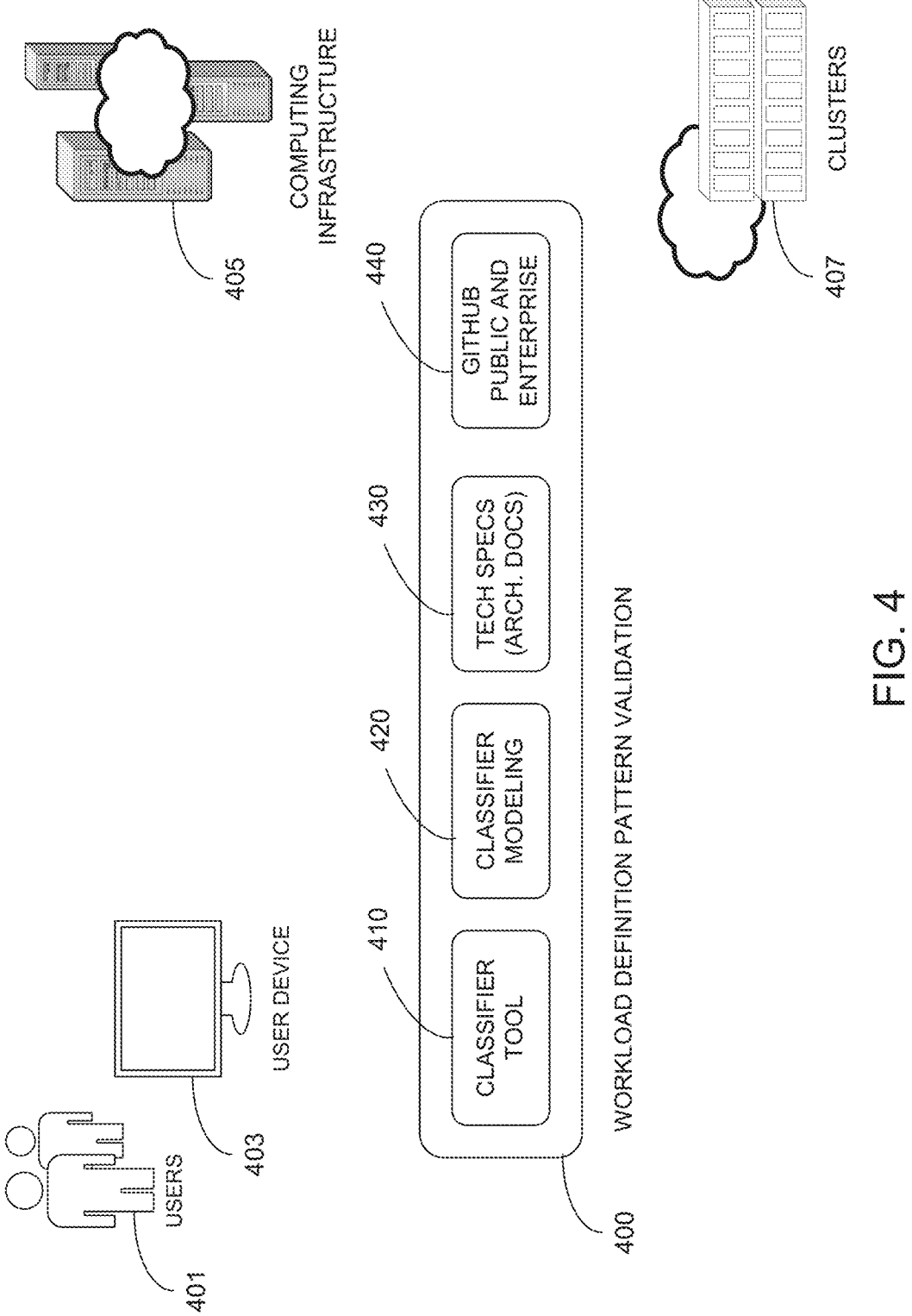
FIG. 4 shows a block diagram of an exemplary environment in accordance with aspects of the invention.

FIG. 4 shows a block diagram of an exemplary environment in accordance with aspects of the invention. In embodiments, the environment includes a computing infrastructure 405 running one or more clusters 407 (also called cluster environments). Users 401 may have user device(s) 403 which are communicatively coupled to the computing infrastructure 405. The computing infrastructure 405 may include modules used to assist the developer by automatically recommending a workload sizing for a new container to be launched in one or more clusters 407 of the computing environment. Before launching a container, the container needs to have a corresponding configuration file which defines the resources necessary to operate within a given cluster. Workload of the container is based on the various resources required. Containers that use similar resources may be considered to be the same family type, e.g., classified as a specific family type.

In an embodiment, the computing infrastructure 405 includes a workload definition pattern validation module 400. The workload definition pattern definition module 400 includes a classifier tool module 410, a classifier modeling module 420, a technical specification (i.e., architectural documents) repository scraping module 430, and one or more GitHub scraping modules 440 for scraping public and enterprise GitHub repositories. Each of the modules 400, 410, 420, 430, 440 may comprise one or more program modules 42 of FIG. 1. Git is a distributed version control system for tracking changes in source code during software development. GitHub is a web-based Git repository hosting service, by GitHub, Inc., which offers all of the distributed revision control and source code management (SCM) functionality of Git as well as adding its own features. While Git is a command line tool, GitHub provides a Web-based graphical interface. It also provides access control and several collaboration features, such as a wikis and basic task management tools for every project. Scraping the repositories at GitHub for configuration files of the same family classification as the container to be launched may be helpful to provide historical information about resources necessary to avoid runtime failures.

In the exemplary environment shown in FIG. 4, user 401 is the person responsible for assessing the workload definition pattern validation for a new container. This action may be performed on user device 403. The computing infrastructure 405 includes computing devices, storage, and network components to host the solution that performs the assessment of the workload definition pattern validation. For example, the computing infrastructure 405 may include one or more computing devices each comprising one or more elements of the computer system/server 12 of FIG. 1. Clusters 407 may have user clusters being accessed to verify the lifecycle or clusters being deployed which requires an ideal workload sizing to avoid runtime failures.

In an embodiment, the classifier tool module 410 is configured to produce results for the container specification classification. Classifier modeling module 420 is configured to model the classifier in order to produce the best output classifier results. The technical specification repository scraping module 430 scrapes architectural documents from a technical specification repository. The technical specification repository is a knowledge database containing information of clusters' unique names, family, limits, requests, and classification. GitHub scraping modules 440 scrape the GitHub unstructured data repositories which are searched for GitHub and historical architectural documentation searching for clusters YAML files. YAML is a data serialization language that is often used for writing configuration files.

The workload definition pattern validation module 400 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

Figure 5:
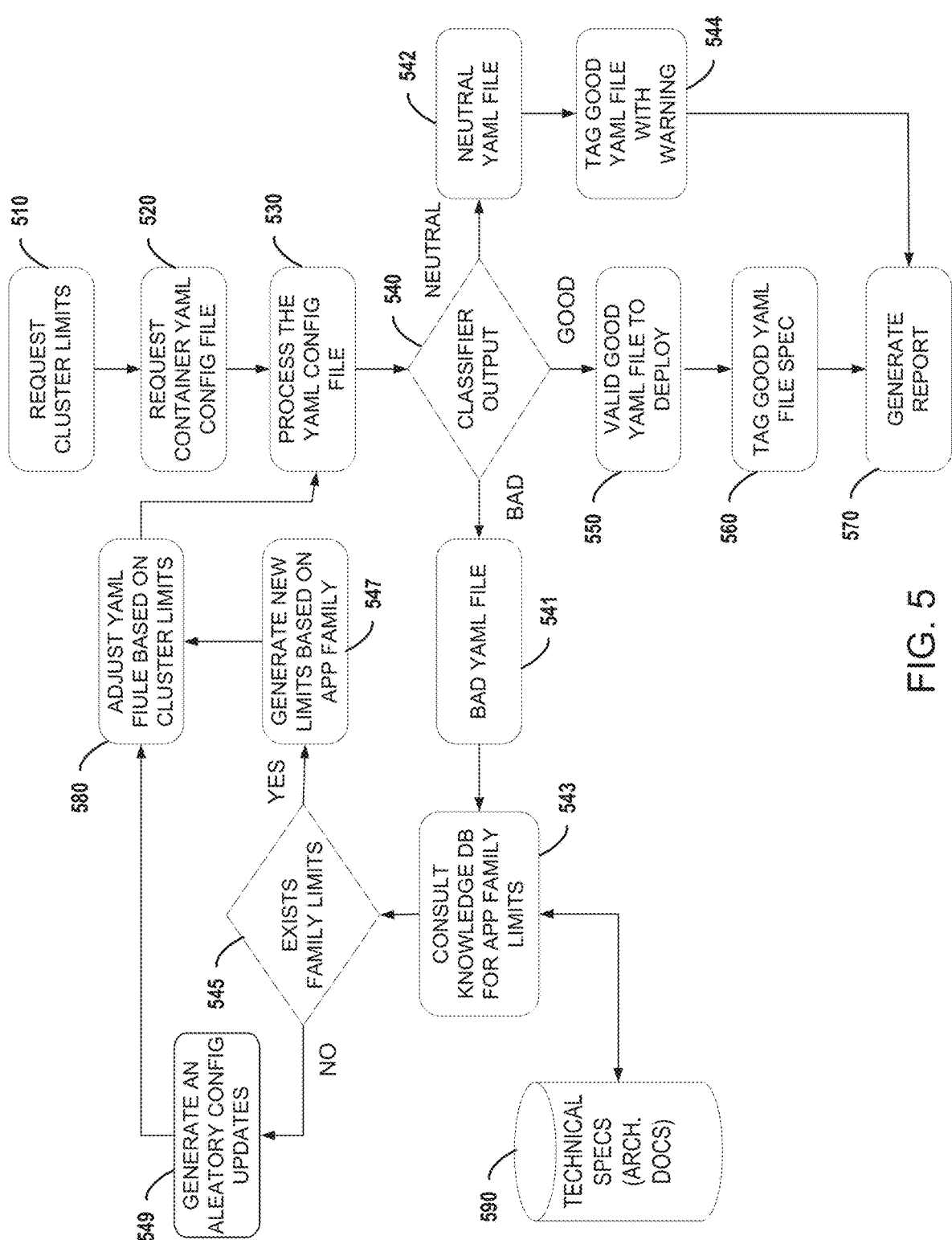
FIG. 5 shows a flowchart of an exemplary method for automated workload sizing, according to an embodiment.

FIG. 5 shows a flowchart of an exemplary computer implemented method for choosing a workload definition, in accordance with embodiments of the present invention. Operations of the method may be carried out in the environment of FIG. 4 and are described with reference to elements depicted in FIG. 4. For example, the steps of the method shown in FIG. 5 may be performed by the workload definition pattern validation module 400 of the computing infrastructure 405 of FIG. 4. At block 510 cluster limits are requested. Given a desired cluster, cluster limits (i.e., total cluster CPU and memory available) are collected to create the container in the cluster. In block 520 the YAML configuration file is requested for the container. This is an initial configuration for the container. An example container YAML file may contain the following information, in for instance, a .YML file format:

```
apiVersion: v1
kind: Pod
metadata:
    name: memory-demo
    namespace: mem-example
spec:
   containers:
   - name: memory-demo-ctr
     image: redis
     resources:
   limits:
       memory: "200Mi"
       cpu: "1"
   requests:
       memory: "100Mi"
       cpu: "0.5"
   command: ["stress"]
   args: ["--vm", "1", "--vm-bytes", "150M", "--vm-hang",
"1"]
```

In this example, the YAML definition indicates the version of the API (e.g., v1) and that it is a Pod type. The specification (spec) is for a container named memory-demo. In this example, the required limits for memory (200 Mi), CPUs (1), are defined, as well as a request for memory (100 Mi) and CPU (0.5). Other limits and requests may be present in any individual YAML configuration file. The sections of interest are extracted from the YAML configuration file to identify a family type and other resource limits, in block 530. For instance, the metadata and spec fields may help represent the family type. The limits and requests fields represent the workload sizing requirements to be ascertained by the automated method discussed herein. The processed YAML file includes a limits and requests section of interest with values to be classified as Good, Neutral or Bad.

Block 540 represents a trained model for classifier output. Training of the model will be discussed later in conjunction with FIG. 6. The classifier model uses the YAML file and classifies the identified limits and requests and provides a qualified outcome of Good, Neutral or Bad to correspond to a likelihood that the associated limits and requests will or will not result in runtime failure of the container. In embodiments, Neutral means there is not enough information to make an informed determination. In an embodiment, output may look as follows.

resources.limits.memory=GOOD
    resources.limits.cpu=GOOD
    resources.requests.cpu=BAD
    resources.requests.memory=BAD In the example above, the resource limits on memory and CPU are Good, but the resource requests are Bad. In embodiments, a classifier output of Bad means the container has a high chance of runtime failure. In this example, the YAML configuration file may be marked Bad in block 541. The system consults knowledge databases for technical specifications, e.g., a technical specification repository 590 (which corresponds to element 430 of FIG. 4) having proven limits for the application/container family in block 543. In an embodiment, technical specification repository 590 includes information specific to the developer team. A determination is made at block 545 whether the technical specification repository 590 has information for the container family type. If limits for the family type were not found in the technical specification repository 590, then an aleatory (i.e., random) update to the configuration file is performed in block 549. While the term aleatory is used, it will be understood that the random value will be larger than that in the YAML file because the initial value has a high probability of runtime failure. A truly random number might include smaller values, which might be unfeasible for the purpose here. For instance, since there is no known family model, the limits and requests sections may be filled with random data. This "random" or aleatory data may be based on predetermined values, or be a randomly selected from a predetermined range of values. In an embodiment, the aleatory values may be based on a generic model trained with configuration data over a wide range of family types. In embodiments, the system modifies the YAML configuration based on the aleatory values for the container in block 580. Processing of the YAML configuration files is then performed in block 530 to once again provide input to the classifier output trained model at 540.

If limits for the family type were found in the technical specification repository 590, then the system verifies that it found a known family model, and based on this model it generates a new "limits and requests" sections for the YAML file, in block 547. An example of a new "limits and requests" section based on the identified family follows.

```
limits:
memory: "400 Mi"
cpu: "5"
requests:
memory: "300 Mi"
cpu: "3"
```

It will be seen that in this example, the identified family defines a memory limit of 400 Mi, a CPU of 5, and memory request of 300 Mi, with CPU 3. The YAML file is then adjusted as above, in block 580.

In embodiments, a classifier output of Good means that the container has a high chance of success with few or no runtime errors. If the trained model 540 classifies the new container's YAML configuration as Good then the YAML file is prepared for deployment in block 550. The YAML file specification is tagged as good in block 560, and a report of this is generated in block 570. The report may be saved in a repository such as 590 for use with future classifier model training and execution.

In embodiments, a classifier output of Neutral prompts the generation of a neutral YAML configuration file in block 542. The neutral configuration file may be tagged as Good but with a warning, in block 544. Tagged YAML files in the technical specification repository 590 may be updated with new classifier tags as more runtime information is received or more data is used to train the classifier model. In implementations, a Neutral tagged file is an unknown configuration, and the classifier model was not able to identify the limits or requests as Good or Bad.

Figure 6:
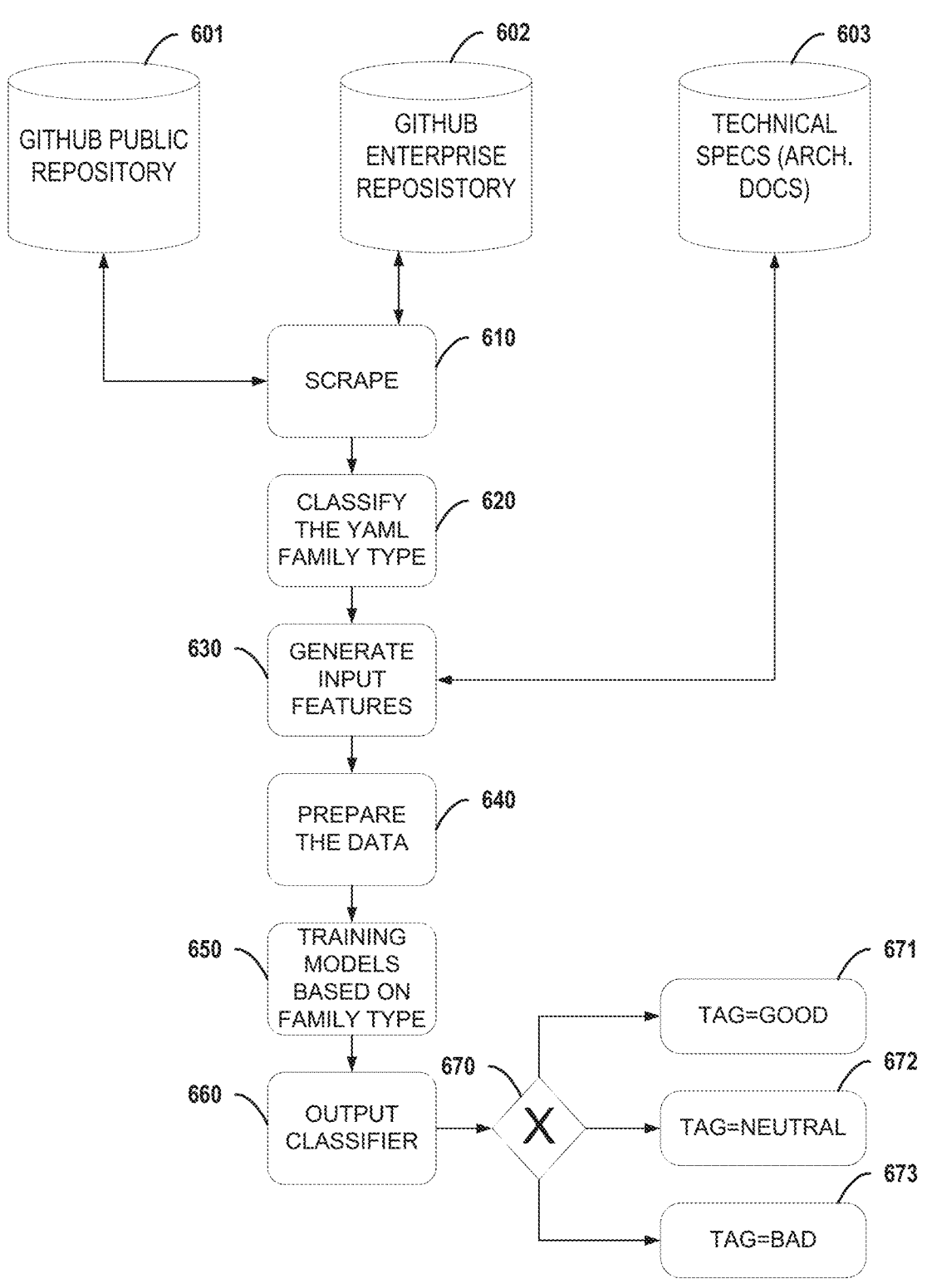
FIG. 6 shows a flowchart of an exemplary method to train a classifier model, according to an embodiment.

FIG. 6 shows an exemplary method for training the classifier model used at step 540 of FIG. 5, according to an embodiment. The steps of the method shown in FIG. 6 may be performed by the workload definition pattern validation module 400 of the computing infrastructure 405 of FIG. 4. While three repositories of container configuration information 601-603 are shown, it will be understood that embodiments may utilize more or fewer repositories. In embodiments, these repositories 601-603 are scraped by modules 430 and 440 of FIG. 4. In an embodiment, a GitHub public repository 601, as well as a GitHub Enterprise repository 602 are scraped for family and limit information for other containers. An unstructured data search is performed in block 610 to scrape the GitHub repositories 601-602 and architectural documentation searching for YAML files. Once YAML files are identified, fields within the configuration file are examined to identify "requests," "limits," "image," and "metadata" information for each configuration file found. A bag of strings (i.e., a matrix of columns for dataframe features for the configurations) is generated using the identified data. In one example, the bag of strings record has the following syntax:

```
Record N: [bag of string[image, metadata] |
resources.limits.memory - int | resources.limits.cpu - int |
resources.requests.cpu - int | resources.requests.memory -
int] | [NEUTRAL]
```

In this example, each column is separated by vertical lines and may represent a specific configuration item for the container. An initial classification of Neutral is associated with this initial string, as a default for the new record/string. In block 620, a classifier module classifies the family type based on the identified fields for container type of "image"

and "metadata." For example, a function "getFamilyName" may be executed to classify the family type using an exemplary syntax as below.

```
getFamilyName([bag of string[image, metadata])=>fam-
ily
```

A sample output of a record with the family name follows.

```
family| resources.limits.memory - int | resources.limits.cpu -
int | resources.requests.cpu - int |
resources.requests.memory - int | [NEUTRAL]
```

In this example, the family name is classified based on containers with a similar configuration with respect to the "resources.limits.memory", "resources.limits.cpu", etc. In an example, a lower weight may be specified for a record due to an unknown lifecycle exit found in the bag of strings data. Data scraped from a public GitHub repository 601 may be given a lower weight than data scraped from the enterprise GitHub repository 602. Data retrieved from a technical specification repository 603 for applications and containers created within the organization may be given the highest weight when training the model.

In block 630, input features for the container are generated. The technical specifications and architectural documents repository for the enterprise, or organization, 603 is searched to identify families and container status for previously known containers' lifecycle information. This technical specification repository 603 has information in particular for the organization or company, and is tailor-made based on the organization's application lifecycles. An executable load is generated using the technical specification information. The system unifies the data, and the data is summarized and prepared in block 640.

In block 640, the data is prepared to aggregate and compact the information into a "Family," "Group," and "Resource" set of records that correspond to the container which is being sized. The data is formatted according to the format required by the training model. Before being input to the model for training, the data may be organized by classifier, data selection, classification, and then normalized and labeled. A data concatenation from multiple sources (e.g., a union) and compact data by "family groups" allows the data to include statistical properties for the resource request/limits features. A union between both records (e.g., outputs from operations 620 and 630 above) is made including a weight based on the source, e.g., 601, 602 or 603. The operation performed in block 640 is a union of the data from operations 620 and 630. It is expected to have several observations for the same family in this union. An exemplary embodiment for the operation 640 is discussed below corresponding to FIGS. 7-8. In an embodiment, the weight based on source is a pre-determined number. The weights establish a pattern to define the relevance of the source record for later use at the training model stage. The weights can hardcoded numbers, to enable the models to be trained. In embodiments, the weight values may be dynamically changed after normalization procedures are applied, as necessary, for better training of the model.

In embodiments, the system trains the classifier model at block 650, based on family type. An output classifier is provided in block 660 for each family type and associated resources (limits, etc.). Family types may be classified and tagged as Good 671, Neutral 672, or Bad 673, as discussed above. In an embodiment, in block 660, a binary file is created with the trained model 670 and ready to be used. In one example, the binary is an executable version of the classifier model which takes input of a container's formatted YAML configuration file and provides an output classifier with the status (e.g., Good 671, Neutral 672 or Bad 673).

Figure 10:
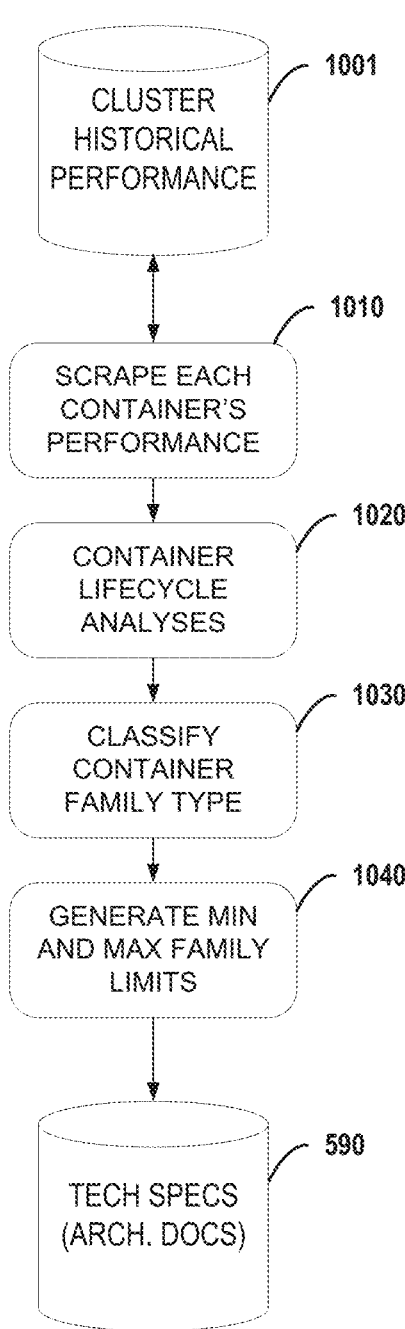
FIG. 10 shows a flowchart of an exemplary method to monitor clusters to provide data to the technical specification database, according to an embodiment.

Now referring to FIG. 10, there is shown a flow diagram for an exemplary method to monitor clusters to provide data to the technical specification repository 590 (FIG. 5). A snapshot overview of container information for each container running in a cluster, e.g., cluster historical performance database 1001, is collected or scraped in block 1010. This collection includes containers that are both alive or dead, i.e., currently running, or ended either naturally or because of a failure. Each container is classified based on its alive status and exit code in block 1020. In an example, if a container is alive, the classification status is set to Neutral. If a container is dead with a bad exit code, the classification status is set to Bad. If the container is dead with a not bad exit code, the classification status is set to Good. It should be noted that just because a container is alive, e.g., running, it may still fail in the future, so it would be premature to set the classification status to Good.

Due to the bag of strings identification, as discussed above, a function is performed to generate a family classification in block 1030. The family classification is based on the specific container type information, i.e., image and metadata. The container information with its unique name, family, limits, requests, and classification status is loaded into the technical specification repository 590 in block 1040. This specification includes minimum and maximum family limits for the container.

Figure 7:
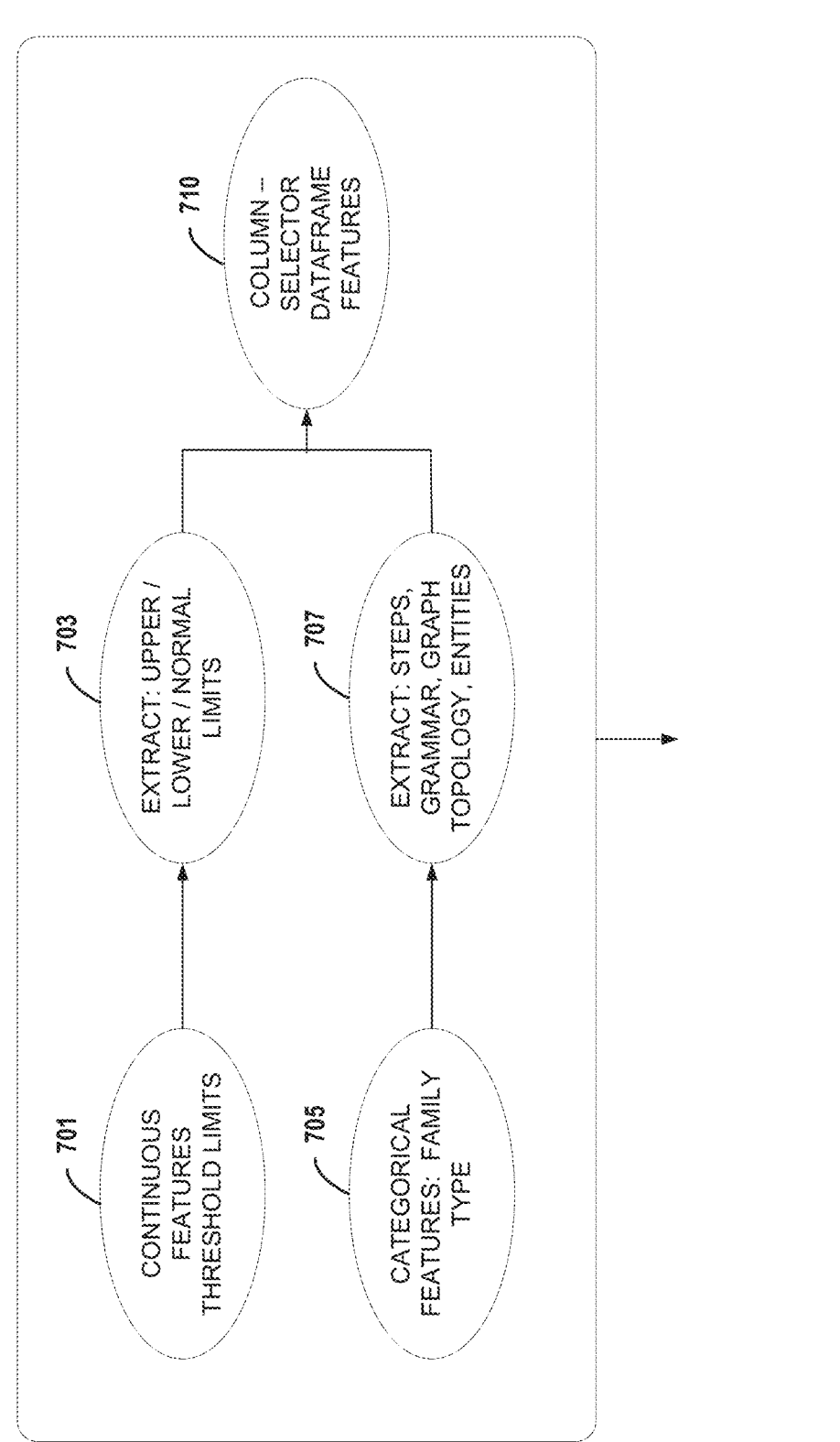
FIG. 7 shows a flowchart of an exemplary method for performing feature analysis for generating input features of a container, according to an embodiment.

Referring now to FIG. 7, there is shown an exemplary method for feature analysis to generate the input features of 630 (FIG. 6). Artificial intelligence modules described herein provide automation, interoperability and usability, through a sequence of operations described here. Embodiments use machine learning techniques to automatically generate the features, parameters associated with the cluster complexity of the containers. Historical information of containers in the instance cluster, as well as other clusters with similar family containers is scraped, e.g., collected, and used to train a machine learning model for workload sizing. Running a new container through the trained model automatically generates the features required to launch the new container and minimize failures.

In an embodiment, input features for the classifier model may be generated by further processing the information retrieved from the GitHub repositories 601-602 (FIG. 6). One focus is to create a schema that structures a planned pipeline with the input features, which means that the family identification and all of its subsequent extraction of important resources values are used to build the meta-model. The data may be aggregated and compacted into Family, Group and Resource categories.

In an example, the data is aggregated and compacted into Family, Group and Resource categories. Continuous features and threshold limits are identified at 701. Upper, lower and normal limits are extracted at 703. The continuous features extraction includes the threshold limits from the resource values to guarantee that the upper/lower and normal limits will be analyzed afterwards, in block 703, based on a given family. This analysis makes the method scalable and technically feasible regardless of the complexity and variety of the possible values conditions. Categorical features are identified, such as family type at 705. Steps, grammar, graph topology and entity data are then extracted at 707. The categorical features include all strings extraction for natural language processing in recognizing that the correct family type is selected for further data preparation steps on the operation choice. As described above, the output of operation (640, FIG. 6), is a union of all data from operations 620 and 630. The extracted data is provided to a column selector for dataframe features at 710. The columns of interest are then provided to the data preparation block 640 (FIG. 6).

Figure 8:
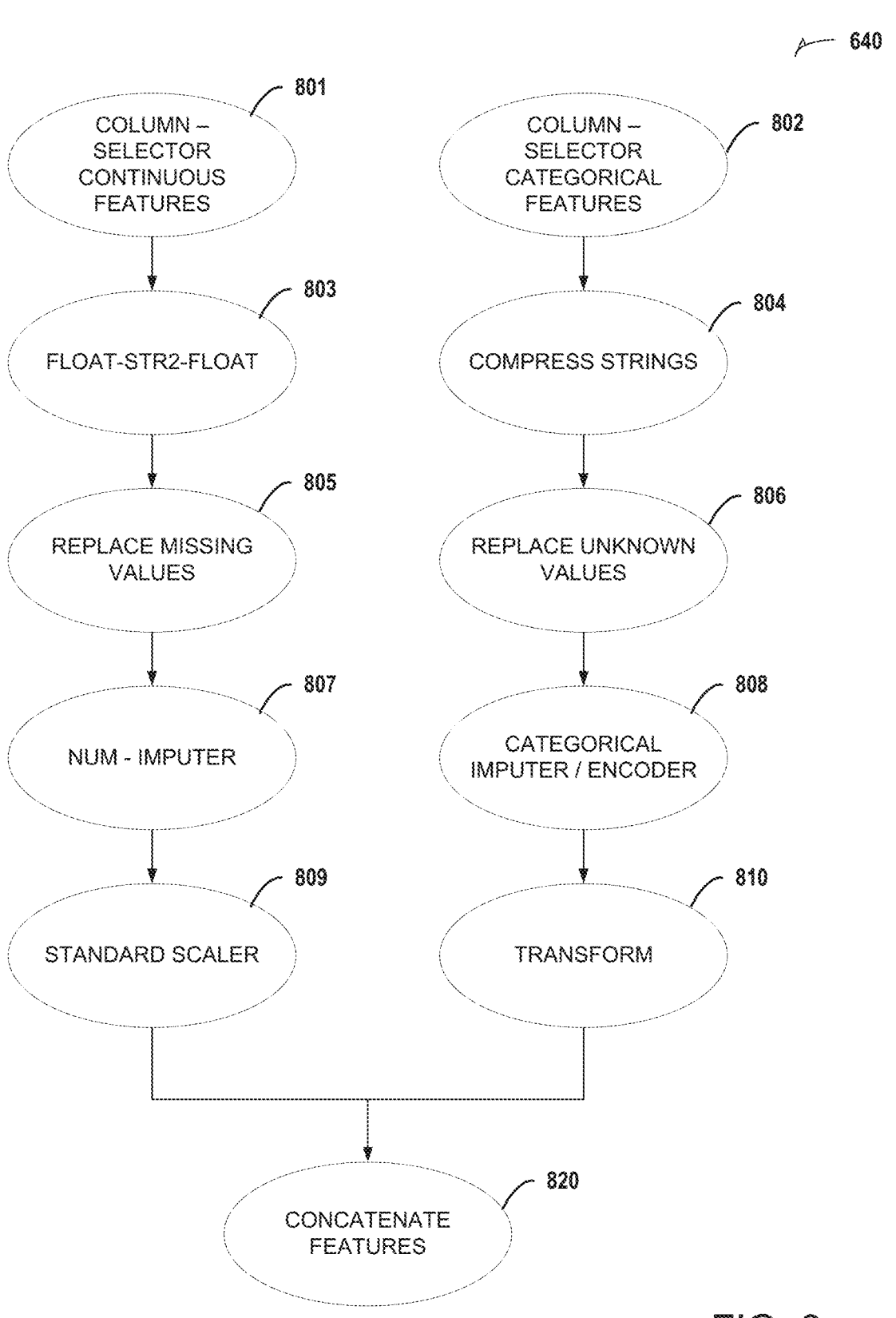
FIG. 8 shows a flowchart of an exemplary method to prepare data to train the classifier model, according to an embodiment.

FIG. 8 shows a flowchart of an exemplary method for preparing data as in operation 640 (FIG. 6) for the classifier training model, according to an embodiment. This operation is responsible for processing the data through a series of transformations, applying numerous operations, for instance, replacement of missing values, normalizing non-required characters, feature selection, feature engineering, among others, where the transformation is specifically designed according to the data type. Then, a final concatenation procedure is performed to assure that the data is ready operate as a trainable pipeline with the precise family type and resource values correlation.

An advantage of this method for container workload sizing is that transformations are automatically selected and performed due to the programming abstraction inherent in the method. It provides interoperability and standardization in processing voluminous amounts of data containing similar conditional dependences in an efficient manner without a need of an expert in Data Science to be consulted each time a new container project starts. This may result in a reduction of more than 80% of the time to go to market.

In an exemplary embodiment, column selector features for continuous features 801 is parsed for float strings in operation 803. The conversion from string to float may be required depending on the algorithm used in implementation, allowing an encoding operation that denotes the values taken on by categorical features. If there are missing values in the data, they are replaced in operation 805. It should be noted that in computing, NaN which stands for "Not a Number," is a member of a numeric data type that can be interpreted as a value that is undefined or unrepresentable, especially in floating-point arithmetic. In an embodiment, NaN values are replaced by the median values of all given feature datapoint with correct values before applying normalization. Numerical information is imputed in operation 807 based on similar historical data. Normalization, i.e., using a standard scaler may be performed in 809. Column selector features for categorical feature are transformed in operation 802. Strings in the data are compressed in operation 804. Unknown values may be replaced in 806 based on similar historical data. In an embodiment, unknown values (NaN) are replaced by the median values of all given feature datapoint with correct values before applying normalization. A categorical imputer is applied in operation 808 to encode information related to categories. The data is transformed in operation 810 and concatenated with the continuous feature data in operation 820.

Figure 9:
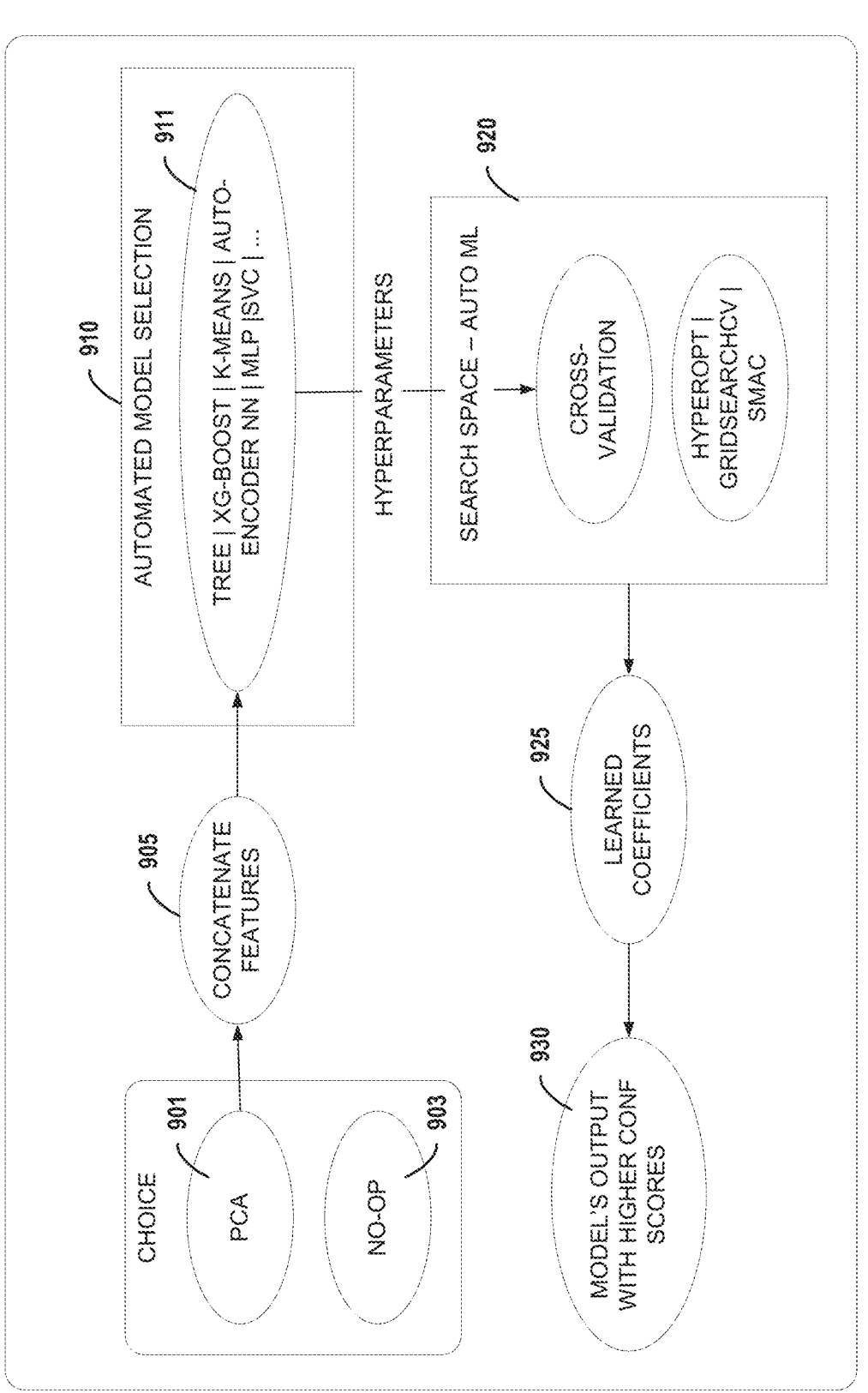
FIG. 9 shows a block diagram of an exemplary system for running prepared data through a classifier model, according to an embodiment.

FIG. 9 is a block diagram of an exemplary system for running prepared data through a classifier model, according to an embodiment corresponding to block 660 of FIG. 6. The initial operation is to reduce the dimensionality by applying either PCA (Principal Component Analysis) 901 or No-Op 903 to extract and reduce the operations, weights and the eigenvectors to fit the same representation of the data, producing concatenate features. The concatenate features 905 already processed are used in the automated model selection 910, which has a subset of important models 911 to be trained in parallel for subsequent evaluation of each ones' performance. In this example, various models for tree, XG-boost, K-means, auto-encoder, etc., may be run simultaneously, producing hyperparameters. The hyperparameters are input to operation 920 which checks for the optimum configuration in terms of accuracy, ensembling and pruning for the out-of-the search-space.

Block 920 denotes a search space operation using the hyperparameters. This search space operation helps fine-tune the hyperparameters used to validate, and applies recommended approaches such as hyperparameter optimization (HyperOpt), or tuning, which is the problem of choosing a set of optimal hyperparameters for a learning algorithm. A hyperparameter is a parameter whose value is used to control the learning process. By contrast, the values of other parameters (typically node weights) are learned. The system performs an optimization procedure which involves defining a search space. This can be thought of geometrically as an n-dimensional volume, where each hyperparameter represents a different dimension and the scale of the dimension are the values that the hyperparameter may take on, such as real-valued, integer-valued, or categorical. A range of different optimization algorithms may be used. In an embodiment, a common library function GridSearchCV method is used, which is responsible for defining a search space as a grid of hyperparameter values and evaluates every position in the grid. A sequential model-based algorithm configuration (SMAC) may be used to optimize other cost metrics, such as the solution quality an algorithm obtains in a fixed runtime. Thus, the search space operation in block 920 is an automated machine learning module that provides learned coefficients 925. The entire operation 660 (FIG. 6) provides a model output with higher confidence scores 930.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for providing an initial workload sizing for a container to be run on a cluster, the method, comprising:

receiving a configuration file containing input values as a candidate to create the container in the cluster using verified cluster limits, wherein a plurality of container family types are defined for the cluster such that containers that use similar resources are in a same container family type, and wherein each container family type comprises a plurality of containers;

verifying the configuration file;

extracting strings from a limits section of the verified configuration file and a requests section of the verified configuration file to identify initial resources for the initial workload sizing;

extracting strings containing input values from the verified configuration file usable to determine the container family type for the container from among the plurality of container family types defined for the cluster;

classifying the verified configuration file using the input values to provide a classification of one of Good, Neutral or Bad using a trained machine learning model, wherein the trained machine learning model was trained using historical information for a plurality of historical containers of family types corresponding to the plurality of container family types defined for the cluster and wherein the classification of Bad indicates a likely runtime failure of the container;

providing the classification as an output;

responsive to the output containing the classification of Good or Neutral, indicating that the configuration file is ready to deploy; and responsive to the output containing the classification of Bad, consulting a knowledge database including technical specifications to determine whether family specification limits exist for the container family type of the container, responsive to determining that family specification limits exist, generating a new set of cluster limits and adjusting the configuration file using the new set of cluster limits to provide an adjusted configuration file; or responsive to determining that family specification limits do not exist, generating a new set of aleatory updates for the configuration file and adjusting the configuration file using the new set of aleatory updates to provide the adjusted configuration file;

extracting strings, classifying the adjusted configuration file, providing an adjusted classification as the output, consulting the knowledge database, and generating another adjusted configuration file in the same manner as the verified configuration file repeatedly until the classification of one of Good or Neutral is provided as output to improve cluster workload deployment efficiency of the cluster and reduce runtime failure of containers in the cluster.

2. The computer implemented method as recited in claim 1, further comprising:

responsive to the output containing the classification of Good, tagging the configuration file as Good; and responsive to the output containing the classification of Neutral, tagging the configuration file as Good with a warning.

3. The computer implemented method of claim 1, wherein the trained machine learning model was trained using a method comprising:

scraping at least one repository having historical information for the plurality of historical containers of family types corresponding to the plurality of container family types defined for the cluster, wherein the historical information includes cluster limits, resource allocations and exit codes associated with the plurality of container family types defined for the cluster;

classifying the container family type for each container of the plurality of historical containers;

generating input features associated with each container family type among the plurality of container family types defined for the cluster;

preparing data including the container family type and associated input features for each historical container for input to the machine learning model; and training the machine learning model with the prepared data to provide the trained machine learning model.

4. The computer implemented method as recited in claim 3, further comprising:

generating a binary file from the trained machine learning model, wherein the binary file, when executed, provides the classification of one of Good, Neutral or Bad as the output, responsive to the input values of the verified configuration file.

5. The computer implemented method as recited in claim 3, wherein the at least one repository includes both a public repository and an enterprise repository, and wherein configuration files scraped from the public repository are assigned a lower weight than configuration files scraped from the enterprise repository in training the machine learning model.

6. The computer implemented method as recited in claim 1, wherein the extracting strings from the limits section of the verified configuration file and the requests section of the verified configuration file to identify initial resources for the initial workload sizing is based on image name and a set of key labels.

7. A computer program product comprising:

one or more computer readable storage media having program instructions collectively stored on the one or more computer readable storage media, wherein the program instructions are executable to provide an initial workload sizing for a container to be run on a cluster, wherein the program instructions include instructions executable to:

receive a configuration file containing input values, the configuration file defined using a predetermined data serialization language, as a candidate to create the container in the cluster using verified cluster limits, wherein a plurality of container family types are defined for the cluster such that containers that use similar resources are in a same container family type, and wherein each container family type comprises a plurality of containers;

verify the configuration file;

extract strings from a limits section of the verified configuration file and a requests section of the verified configurations file to identify initial resources for the initial workload sizing;

extract strings containing input values from the verified configuration file usable to determine the container family type for the container from among the plurality of family types defined for the cluster;

classify the verified configuration file using the input values to provide a classification of one of Good, Neutral or Bad using a trained machine learning model, wherein the trained machine learning model was trained using historical information for a plurality of historical containers of family types corresponding to the a plurality of container family types defined for the cluster, and wherein the classification of Bad indicates a likely runtime failure of the container;

provide the classification as an output;

responsive to the output containing the classification of one of Good or Neutral, indicate that the configuration file is ready to deploy; and responsive to the output containing the classification of Bad, consult a knowledge database including technical specifications to determine whether family specification limits exist for container family type of the container, responsive to determining that family specification limits exist, generate a new set of cluster limits and adjust the configuration file using the new set of cluster limits to provide an adjusted configuration file; or responsive to determining that family specification limits do not exist, generate a new set of aleatory updates for the configuration file and adjust the configuration file using the new set of aleatory updates to provide the adjusted configuration file; and extract strings, classify the adjusted configuration file, provide an adjusted classification as the output, consult the knowledge database, and generate another adjusted configuration file in the same manner as the verified configuration file repeatedly until the classification of one of Good or Neutral is provided as the output to reduce runtime failure of containers in the cluster and improve cluster workload deployment efficiency of the cluster.

8. The computer program product of claim 7, wherein the trained machine learning model was trained using program instructions executable to:

scrape at least one repository having historical information for the plurality of historical containers of family types corresponding to the plurality of container family types defined for the cluster, wherein the historical information includes cluster limits, resource allocations and exit codes associated with the plurality of container family types defined for the cluster;

classify the container family type for each container of the plurality of historical containers;

generate input features associated with each container family type among the plurality of container family types defined for the cluster;

prepare data including the container family type and associated input features for each historical container for input to the machine learning model; and train the machine learning model with the prepared data to provide the trained machine learning model.

9. The computer program product as recited in claim 8, further comprising program instructions executable to:

generate a binary file from the trained machine learning model, wherein the binary file, when executed, provides the classification of one of Good, Neutral or Bad as the output, responsive to the input values of the verified configuration file.

10. The computer program product as recited in claim 8, wherein the at least one repository comprises both a public repository and an enterprise repository, and wherein configuration files scraped from the public repository are assigned a lower weight than configuration files scraped from the enterprise repository in training the machine learning model.

11. The computer program product as recited in claim 7, wherein to extract strings from the limits section of the verified configuration file and the requests section of the verified configuration file to identify initial resources for the initial workload sizing is based on an image name and a set of key labels.

12. The computer program product as recited in claim 7, further comprising program instructions executable to:

responsive to the output containing the classification of Good, tag the configuration file as Good; and responsive to the output containing the classification of Neutral, tag the configuration file as Good with a warning.

13. A system comprising:

a processor, a computer readable memory, one or more computer readable storage media, and program instructions collectively stored on the one or more computer readable storage media, the program instructions executable to provide an initial workload sizing for a container to be run on a cluster, wherein the program instructions include instructions executable to:

receive a configuration file containing input values, the configuration file defined using a predetermined data serialization language, as a candidate to create the container in the cluster using verified cluster limits, wherein a plurality of container family types are defined for the cluster such that containers that use similar resources are in the same family type, and wherein each container family type comprises a plurality of containers;

verify the configuration file;

extract strings from a limits section of the verified configuration file and a requests section of the verified configuration file to identify initial resources for the initial workload sizing;

extract strings containing input values from the verified configuration file usable to determine the container family type for the container from among the plurality of container family types defined for the cluster;

classify the verified configuration file using the input values to provide a classification of one of Good, Neutral or Bad, using a trained machine learning model, wherein the trained machine learning model was trained using historical information for a plurality of historical containers of family types corresponding to the plurality of container family types defined for the cluster, and wherein the classification of Bad indicates a likely runtime failure of the container;

provide the classification as an output;

responsive to the output containing the classification of Good or Neutral, indicate that the configuration file is ready to deploy; and responsive to the output containing the classification of Bad, consult a knowledge database including technical specifications to determine whether family specification limits exist for the container family type of the container, responsive to determining that family specification limits exist, generate a new set of cluster limits and adjust the configuration file using the new set of cluster limits to provide an adjusted configuration file, or responsive to determining that family specification limits do not exist, generate a new set of aleatory updates for the configuration file and adjust the configuration file using the new set of aleatory updates to provide the adjusted configuration file;

extract strings, classify the adjusted configuration file, provide an adjusted classification as the output, consult the knowledge database, and generate another adjusted configuration file in the same manner as the verified configuration file repeatedly until the classification of Good or Neutral is provided as the output, to improve cluster workload deployment efficiency of the cluster and reduce runtime failure of containers in the cluster.

14. The system as recited in claim 13, further comprising program instructions executable to:

responsive to the output containing the classification of Good or Neutral, tag the configuration file as Good; and responsive to the output containing the classification of Neutral, tag the configuration file as Good with a warning.

15. The system as recited in claim 13, further comprising program instructions executable to train the trained machine learning model including instructions executable to:

scrape at least one repository having historical information for the plurality of historical containers of family types corresponding to the plurality of container family types defined for the cluster, wherein the historical information includes cluster limits, resource allocations and exit codes associated with each of the plurality of container family types defined for the cluster;

classify the container family type for each of the plurality of container family types defined for the cluster;

generate input features associated with each container family type among the plurality of container family types defined for the cluster;

prepare data including the container family type and associated input features for each historical container for input to the machine learning model; and train the machine learning model with the prepared data to provide the trained machine learning model.

16. The system as recited in claim 15, further comprising program instructions executable to:

generate a binary file from the trained machine learning model, wherein the binary file, when executed, provides the classification of one of Good, Neutral or Bad as the output, responsive to the input values of the verified configuration file.

17. The system as recited in claim 15, wherein the at least one repository comprises both a public repository and an enterprise repository, and wherein configuration files scraped from the public repository are assigned a lower weight than configuration files scraped from the enterprise repository in training the machine learning model.

18. The system as recited in claim 15, wherein the historical information comprises historical container resource allocations and associated container exit codes.

19. The system as recited in claim 13, wherein to extract strings from the limits section of the verified configuration file and the requests section of the verified configuration file to identify initial resources for the initial workload sizing is based on an image name and a set of key labels.

20. The system as recited in claim 13, further comprising program instructions executable to receive the configuration file containing input values from a user and, when the configuration file is ready to deploy, provide the configuration file to the user.

\* \* \* \* \*